2,820,055
MANUFACTURE OF ACETOXYPIVALIC ACID BY THE OXIDATION OF ACETOXYPIVALDEHYDE

John R. Caldwell and James C. Martin, Kingsport, Tenn., assignors to Eastman Kodak Company, Rochester, N. Y., a corporation of New Jersey No Drawing. Application January 27, 1955
Serial No. 484,553

3 Claims. (Cl. 260—491)

This invention concerns the manufacture of acetoxypivalic acid from acetoxypivaldehyde by oxidation with nitrogen dioxide.

Acetoxypivalic acid is known in the prior art. In the preparation described by Wessely in Monatshefte Fur Chemie, vol. 22, page 66 (1901), hydroxypivaldehyde is treated with potassium hydroxide to give the acid in a maximum yield of only 50% because one-half of the aldehyde is converted to the glycol. Blaise and Marcilly, in the Bulletin Societe Chimique de Paris, vol. 31, pages 110–130 (1904), formed acetoxypivalic acid by condensing brominated long-chain ethers with trioxy methylene in the presence of zinc and decomposing the resulting organo metallic composition with water.

An object of this invention is to provide a new and improved method for the production of acetoxypivalic acid. Another object of this invention is to provide a method for the manufacture of hydroxypivalic acid esters from acetoxypivaldehyde without the isolation of any intermediate products.

The objects of the invention are accomplished by heating acetoxypivaldehyde with nitrogen dioxide and distilling to obtain acetoxypivalic acid. If hydroxypivalic acid esters are desired, the crude oxidation product is heated with an alcohol and an acid catalyst. The desired ester is subsequently distilled.

Our process is an improvement over the previously known methods for making hydroxypivalic acid because acetoxypivaldehyde can be converted to hydroxypivalic acid in good yields and with relatively few side reactions. Our process can be used for the commercial preparation of acetoxypivalic acid without resorting to expensive starting materials. It is particularly valuable for the production of esters of hydroxypivalic acid.

In general, the acetoxypivaldehyde is dissolved in a suitable solvent, usually carbon tetrachloride, nitrogen dioxide is added at about 60° C. and the reaction refluxed. The total time required is from 2 to 3 hours after which acetoxypivalic acid may be obtained by distilling the reaction mixture. If esters of hydroxypivalic acid are desired, the oxidation product is stripped of solvent and then refluxed with the desired alcohol and an esterification catalyst such as sulfuric acid or p-toluene sulfonic acid.

The reaction proceeds as shown in the following equation:

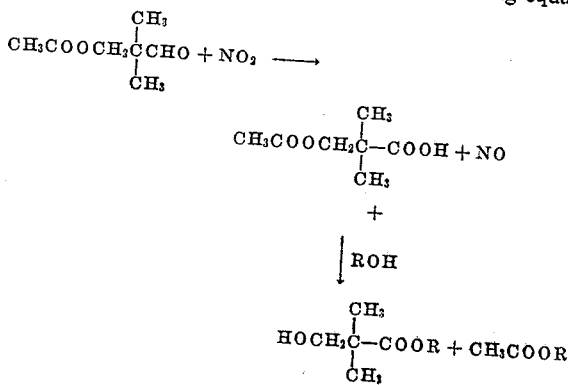

where R=alkyl having 1 to 10 carbon atoms.

Suitable solvents include those that are unaffected by the reactants and which will also dissolve both reactants. Examples are carbon tetrachloride, tetrachloroethane, etc.

The preferred minimum reaction temperature is 60° C. Below that temperature the oxidation proceeds rather slowly.

The following examples serve to illustrate but do not limit the invention.

Example 1

A solution of 72 g. of acetoxypivaldehyde (0.5 mole) in 300 ml. of carbon tetrachloride was heated to 65° C. with stirring and a solution of 23 g. of nitrogen dioxide (0.5 mole) in 50 ml. of carbon tetrachloride was added slowly over a period of one hour. The reaction flask was equipped with a Dry Ice condenser for the purpose of continuously returning nitrogen dioxide to the reaction while permitting nitric oxide to escape. The reactants were refluxed for one hour, and then the solvent was evaporated, leaving a residue that crystallized upon cooling. This residue was vacum distilled to give 57.8 g. of acetoxypivalic acid with a B. P. of 110–112° C. at 2.5 mm. The distillate solidified on standing. It had the following analysis:

Neutralization equivalent (theoretical)_____ 160
Neutralization equivalent (found)_____ 165

This represents a yield of 72% of acetoxypivalic acid.

Example 2

A solution of 72 g. of acetoxypivaldehyde (0.5 mole) in 300 ml. of carbon tetrachloride and 23 g. of nitrogen dioxide (0.5 mole) in 50 ml. of carbon tetrachloride were reacted as in Example 1; however, instead of distilling the crude reaction residue, it was treated as follows: After evaporation of the solvent, the residue was dissolved in 300 ml. of butanol and 0.5 ml. of concentrated sulfuric acid was added. This solution was refluxed with a Deans-Stark water trap for four hours. Only a small amount of water separated. After the reaction solution had cooled, it was stirred with a sodium carbonate-water slurry. After filtering, the solution was distilled and yielded 56.5 g. of material with a B. P. of 74–76° C. at 1.3 mm. The yield of butyl hydroxypivalate was 65%. It had the following analysis:

Saponification equivalent (theoretical)_____ 174
Saponification equivalent (found)_____ 174

Acetoxypivaldehyde can be prepared from hydroxypivaldehyde by the method shown by Hagemeyer and De Cress in The Chemistry of Isobutyraldehyde and Its Derivatives, page 20, published in 1953 by the Eastman Kodak Company. The hydrolysis of acetoxypivalic acid to hydroxypivalic acid is readily accomplished by classic procedures using mineral acid catalysts.

Acetoxypivalic acid and the esters of hydroxypivalic acid are useful for the manufacture of high-melting linear polyesters as disclosed in U. S. Patent 2,658,055.

We claim:

1. A process for obtaining acetoxypivalic acid from acetoxypivaldehyde comprising dissolving the acetoxypivaldehyde in a solven selected from the class consisting of carbon tetrachloride, 1,2-dichloroethane, trichloroethane and tetrachloroethane, adding nitrogen dioxide, and refluxing the mixture from 2–3 hours.

2. A process for the production of acetoxypivalic acid from acetoxypivaldehyde comprising dissolving the acetoxypivaldehyde in carbon tetrachloride, adding nitrogen dioxide and refluxing the mixture from 2–3 hours.

3. A process for obtaining acetoxypivalic acid from acetoxypivaldehyde comprising dissolving the acetoxypivaldehyde in carbon tetrachloride, heating the mixture to a temperature of from 50–70° C., adding nitrogen dioxide while the mixture is maintained at a temperature of from 50–70° C. and refluxing the mixture from 2–3 hours.

References Cited in the file of this patent

UNITED STATES PATENTS

| | | |
|---|---|---|
| 2,176,201 | Brooks | Oct. 17, 1939 |
| 2,298,387 | Kenyon et al. | Oct. 13, 1942 |
| 2,425,029 | Cass | Aug. 5, 1947 |
| 2,437,410 | Tuerck et al. | Mar. 9, 1948 |
| 2,459,677 | Ballard et al. | Jan. 18, 1949 |

OTHER REFERENCES

Beilstein, Band 3 (1921), page 330.